United States Patent [19]

Comper et al.

[11] Patent Number: 4,874,307

[45] Date of Patent: Oct. 17, 1989

[54] CUTTING DEVICE FOR HIGH-TEMPERATURE GRANULATION OF THERMOPLASTIC POLYMERS

[75] Inventors: Lucia Comper, Castel D'Ario; Francesco Ferrari, Virgilio, both of Italy

[73] Assignee: Montedipe S.p.A., Milan, Italy

[21] Appl. No.: 115,118

[22] Filed: Nov. 2, 1987

[30] Foreign Application Priority Data

Nov. 3, 1986 [IT] Italy ................... 22214 A/86

[51] Int. Cl.⁴ .................................... B29B 9/00
[52] U.S. Cl. ........................... 425/311; 264/142; 425/313
[58] Field of Search ............... 425/313, 316, 310, 306, 425/307, 311; 264/142

[56] References Cited

U.S. PATENT DOCUMENTS

| | | | |
|---|---|---|---|
| 3,196,487 | 7/1965 | Snelling | 425/313 |
| 3,266,090 | 8/1966 | Gosney | 425/313 |
| 3,292,212 | 12/1966 | Pomper | 425/311 |
| 3,467,987 | 9/1969 | Foster | 425/313 |
| 3,867,082 | 2/1975 | Lambertus | 425/313 |
| 4,569,809 | 2/1986 | Baggett | 425/142 |
| 4,671,756 | 6/1987 | Bertolotti | 425/142 |

Primary Examiner—Jay H. Woo
Assistant Examiner—Khanh P. Nguyen
Attorney, Agent, or Firm—Stevens, Davis, Miller & Mosher

[57] ABSTRACT

Cutting device for the high-temperature granulation of thermoplastic polymers, which includes a rotor rigidly keyed on a drive shaft, a blade-carrier disc on which a thrust bearing is applied, blades integral with said disc, and an articulated coupling inserted between the rotor and the blade-carrier disc.

15 Claims, 3 Drawing Sheets

CUTTING DEVICE FOR HIGH-TEMPERATURE GRANULATION OF THERMOPLASTIC POLYMERS

FIELD OF THE INVENTION

The present invention relates to a cutting device for the high-temperature granulation of thermoplastic polymers.

More particularly, the present invention relates to a cutting device for the high-temperature granulation of thermoplastic polymers, wherein the cutting of the monofilaments exiting the die is directly carried out on the face of said die.

BACKGROUND OF THE INVENTION

Devices for the high-temperature granulation of thermoplastic materials comprise, in general:

(a) a die, constituted by a heated perforated body;
(b) a chopping device comprising a rotary drive shaft, provided with a blade-carrier disc, and with a system for positioning the blades against the outer face of the die;
(c) a granule-collecting chamber; and
(d) a system for feeding and distributing a temperature-controlled fluid, generally water, necessary for cooling and conveying out of the collecting chamber the chopped granules.

The thermoplastic material in the molten state is extruded through the bores of the die; the monofilaments exiting the die are cut by the rotary blades and the so-obtained granules are cooled and removed by means of the temperature-controlled fluid.

The cutting device generally comprises a cutting plate, constituted by the outer face of the die; and blades, mounted on a blade-carrier disc keyed on the drive shaft, driven to revolve in front of the cutting plate, at a distance adjusted by means of an axial-shift device.

Several high-temperature cutting devices are known which however do not completely fulfill all of the technological requirements.

Thus, for example, cutting devices are known which are equipped with rigid blades integral with the drive shaft. In these devices, the adjustment of the position of the blades is difficult and not precise, because of the axial stiffness of the whole, and, in practice, in as much as it is not possible to achieve a sufficient uniformity in the behavior of the blades, a poor quality of cutting and/or severe wear of the cutting elements results.

In order to overcome these drawbacks, cutting devices have been proposed which are equipped with elastic blades, or wherein the blade-carrier disc is axially loaded by means of springs.

Because of the sliding contact between the blades and the die face, in these devices a wear of a diffused type occurs.

Furthermore, these cutting devices of the prior art are not suitable to be indifferently applied for all types of thermoplastic polymers. In fact, the devices equipped with rigid blades are not suitable for use for relatively soft or low-viscosity polymers, because, in as much as the blades must be adjusted in a position very close to the face of the die, in practice areas of irregular blade-plate contact occur, with resulting very intense wear.

Devices equipped with elastic blades, or with a spring-urged blade-carrier disc, on the contrary, are not suitable for polymers with relatively high values of viscosity and hardness, in that, in as much as a high thrust of the blades against the plate is necessary, they show a quick wear.

In the Italian patent applications No. 21,325 A/84 and No. 22,649 A/84, cutting devices have been proposed which comprise a blade-carrier disc rigidly keyed on the drive shaft, and sliding blades applied to the disc in a non-rigid fashion, but associated with inertial elements, e.g., relatively heavy masses movable inside guides provided in the same blade-carrier disc. These devices, even if they make it possible to satisfactorily solve the problem of the wear of the cutting elements, have been shown to be not very suitable for the granulation of thermoplastic materials, because at the high speeds the moving parts do not succeed in adapting themselves to the die.

SUMMARY OF THE INVENTION

It has now been discovered, in accordance with the present invention, that all of the above mentioned drawbacks may be overcome by means of a cutting device for the high-temperature granulation of thermoplastic polymers, which comprises:

(a) a rotor rigidly keyed on the drive shaft;
(b) a blade-carrier disc on which a thrust bearing is coaxially applied;
(c) blades which face the cutting plate, rigidly applied or attached to the blade-carrier disc; and
(d) an articulated system or arrangement inserted between the rotor and the disc.

The rotor rigidly keyed on the drive shaft is constituted by a metal mass, preferably of cylindrical shape, which performs the function of transmitting the motion of revolution from the drive shaft to the articulated system, and thence to the blade-carrier disc.

Preferably, the rotor comprises one or more hollows designed for housing a variable-load elastic system, which urges the articulated coupling/blade-carrier disc group against the cutting plate during operation.

The elastic system which is preferred in the practical embodiment of the cutting device of the present invention is constituted by one or more variable-load springs.

The thrust bearing applied to the blade-carrier disc is of antifriction material, is positioned in contact with the cutting plate, and is urged against the same by the variable-load elastic system. Such antifriction material comprises such products as graphite, PTFE, (polytetrafluoroethylene) fiberglass-filled PTFE, graphite impregnated with antifriction materials such as, e.g., metals or synthetic resins, etc.

Such antifriction material may have different geometrical shapes, but it preferably has a ring shape, with said ring being positioned along the periphery of the blade-carrier disc.

The ring shape of the thrust bearing is not intended as being limitative; different shapes, e.g., disc shapes, preferably symmetrical relative to the axis of the blade-carrier disc, may be used as well.

Such thrust bearing may also be constituted by a number of parts, e.g., small discs or rings positioned symmetrically around the axis of the blade-carrier disc.

The bearing is provided with splines which facilitate and favor the generation of a supporting hydrodynamic fluid film which, by interposition between the die and the bearing, keeps the blade-carrier disc spaced apart from the chopping plate, reducing the friction, and hence the wear of the cutting elements, of the plate and of the same bearing, to negligible values.

The thrust bearing has a contact surface such as to insure that a pressure shall be generated which does not interrupt the liquid operating film, and a thickness within the range from 5 to 50 mm, preferably from 5 to 20 mm.

The operating hydrodynamic fluid film is generated, between the plate and the bearing, during the operation of the cutting device of the present invention, due to the presence of the process liquid, generally water, which provides for the cooling and the removal of the freshly cut polymer granules.

The shifting of the blade-carrier disc away from the cutting plate may occur thanks to the presence of the articulated system and of the elastic system.

The blades facing the cutting plate may be of the shear type or they may be sloping relative to the cutting plate, for accomplishing the knife-mode cut.

Their position is adjusted relative to the blade-carrier disc by means of adjustment screws in such a way that each cutting edge comes to rest against the die, and the blades are then fastened by means of suitable blocking screws.

During the operation of the cutting device of the present invention, the cutting edges of the blades will no longer touch the die, but will be spaced apart from it by a distance at least equal to the thickness of the operating hydrodynamic film.

The blades may be made from materials normally used for that purpose, such as e.g., treated or not-treated steels, with or without antiwear surfacings, brass, antiwear bronzes, etc.; they can be of either the stiff or the elastic type.

The articulated system interposed between the rotor and the disc, or, more particularly, between the elastic system and the disc, makes possible the coaxiality, and hence the coplanarity of the die and the blade-carrier disc, also in the presence of possible misalignments of the axis of the drive shaft, relative to the axis of the die, and hence guaranteeing an evenness of cutting throughout the plate surface, apart from possible alignment problems. This can be constituted by a normal mechanical articulated coupling such as, e.g., by a swinging claw coupling or a spherical coupling, or by any system which makes it possible to achieve parallelism between the cutting plate and the blade-carrier disc, and hence an evenness of cutting throughout the plate surface.

An example of an articulated system, different from the mechanical coupling, is that constituted by two or more bars fastened in different parts to the rotor keyed on the drive shaft, and each having a slot through which a bolt runs, which is screwed down to the blade-carrier disc; for the articulation function to be achieved. The surface area of the slot must be larger than the cross-sectional surface area of the bolt.

For exemplifying purposes, the chopping device of the present invention was tested and tried out for the cutting of polymeric filaments with foaming agents.

The following conditions were adopted:

| | |
|---|---|
| polymer flowrate | 60 kg/h |
| water flowrate | 3,000 l/h |
| speed of revolution | 2,000 rpm |
| number of knives | 3 |
| distance of the plane of the cutting edges from the die | 30 μm |

As the polymers, crystal polystyrene type MFI 3 and SAN resin type MFI 30, were used each containing 6% of pentane, manufactured by Montedipe, S.p.A.

The system constituted by the hydrodyanmic thrust bearing and the articulated coupling showed a good operating behavior over time, and a good adaptation to the die, this latter guaranteeing regularity of chopping.

The wear of the bearing (graphite ring) was negligible, or anyway comparable to that of the tools employed.

The tools were of super-high speed steel, and operated in the knife mode.

Advantages offered by the device of the present invention are:

negligible wear of the cutting parts;

p uniformity of behavior of the blades at all points of their trajectory on the plate; also in case of plates of less than perfect planarity or in the presence of structural and/or assemblage defects, such as an imperfect perpendicularity between the drive shaft and the cutting plane; imperfect parallelism between the cutting plate and the plane of the cutting edges of the blades; elastic or thermal deformations of the plate, etc.;

possibility of operating within a range of very high cutting speeds, not contraindicated as relates to the wear, and favorable for the separation of the granules from the blades;

ease of poitioning and adjustment of the blades against the plate;

possibility of granulating any polymers; and regularity of operation and reduced maintenance requirements.

The structural and functional characteristics of the present cutting device for the high-temperature granulation of thermoplastic polymers will be still better understood from the following disclosure in greater detail, wherein reference is made to the figures of the attached drawings, which show some preferred forms of practical embodiment, exemplifying but non-limitative of the scope of the present invention; and wherein.

In the figures, corresponding parts are indicated with the same reference numerals.

Figure 1:
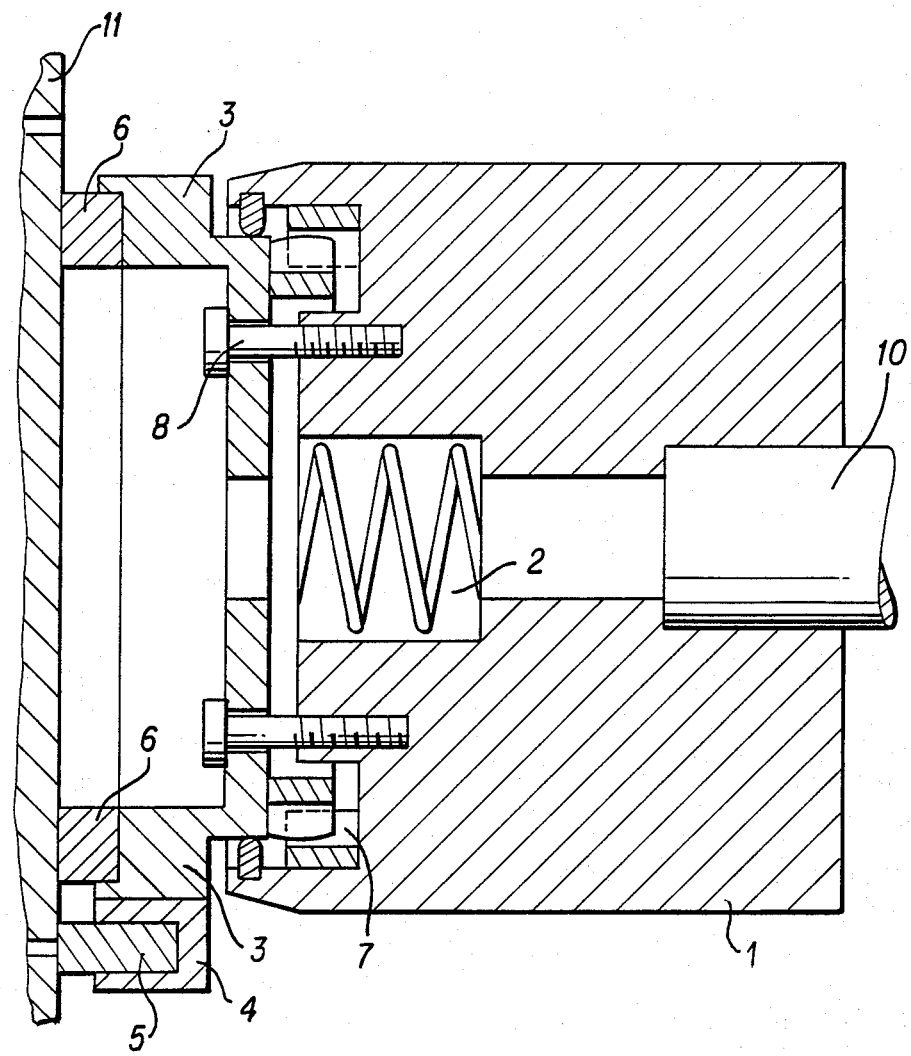
FIG. 1 is a cross-section of a device according to the present invention.

Referring to the figures, the cutting device of the present invention comprises a rotor (1) of substantially cylindrical shape, rigidly keyed on the drive shaft (10) and an elastic system (2) constituted by springs pushing or acting on small pistons located between the blade-carrier disc (3) and the springs themselves.

The elastic system is disposed between the rotor (1) and the blade-carrier disc (3), this latter facing the die (11).

Figure 3:
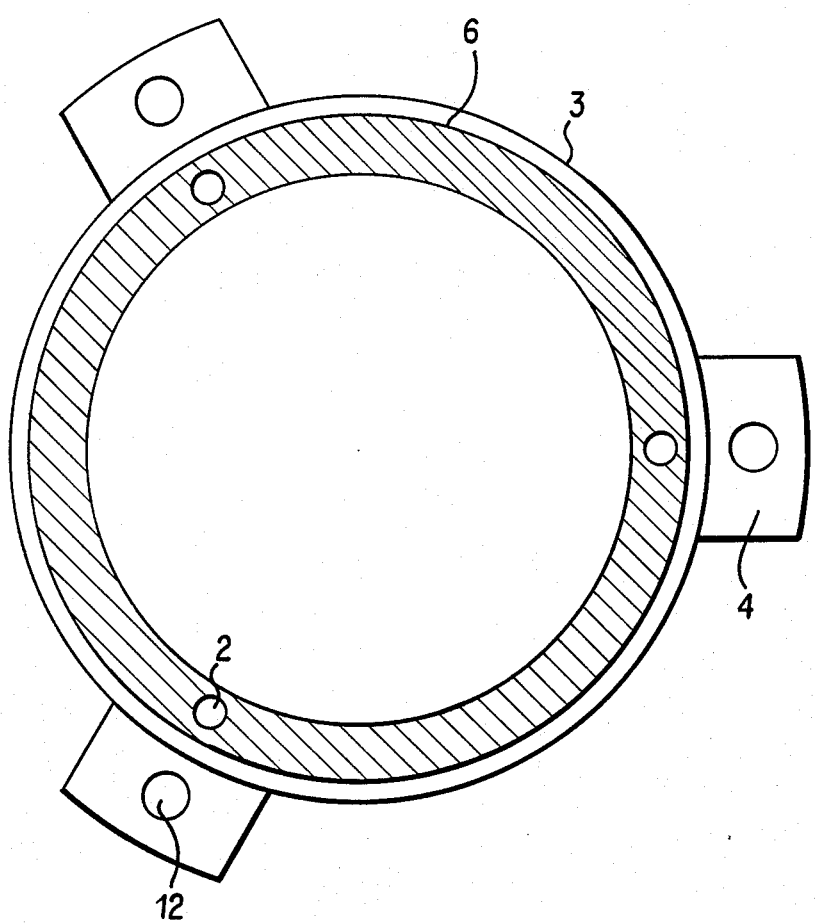
FIG. 3 is a section of FIG. 2, on a plane passing through AA.

On the blade-carrier disc (3) are applied the thrust bearing (6) of ring-like shape, and the knives or blades (5) by means of the appendices or ears (4) provided with blocking bores (12), as is well known to those skilled in the art. See also FIG. 3.

Between the rotor (1) and the blade-carrier disc (3), the articulated system (7), of the mechanical coupling type, is interposed; it comprises the blocking screws (8), so adjusted as to enable the elastic system (2) to perform its desired thrust action.

Figure 2:
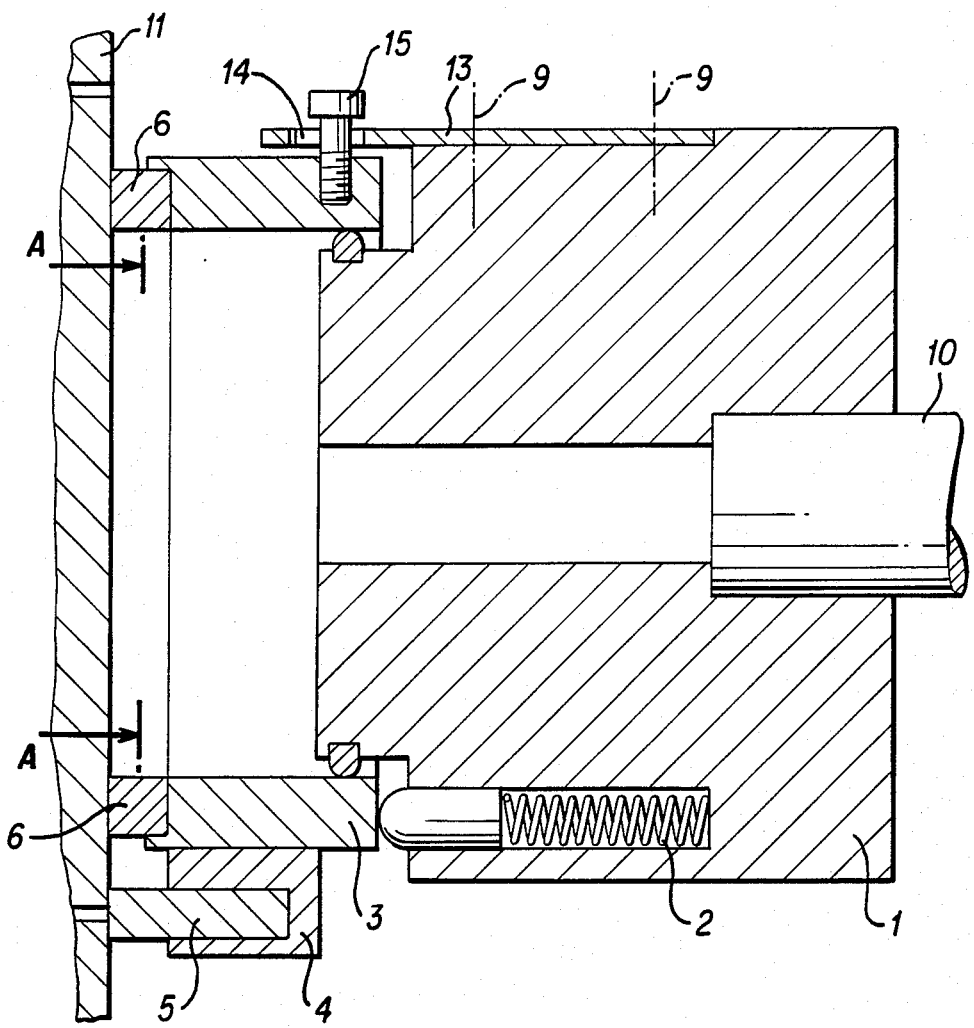
FIG. 2 is a cross-section of a second form of practical embodiment of the device of the present invention.

The articulated system may comprise, as an alternative to the mechanical coupling, bars (13), fastened to the rotor by screws (9), schematically shown by dash lines, said bars being provided with slots (14) through which the blocking screws (15) run, which are screwed down to the blade-carrier disc. See FIG. 2.

During operation, the chopping device of the present invention is arranged, with respect to the die or cutting plate (11), in such a way that the thrust bearing (6) and the cutting edges of the blades (5) come in contact with the same cutting plate (11).

By suitable means, not shown in the figures but per se conventional, the loading is produced by the elastic system (2), which respectively presses the articulated coupling (7) or (13), the blade-carrier disc (3), the bearing (6) and the blades (5) against the die (11).

The articulated system insures the coincidence of the axis of the blade-carrier disc (3) with the axis of the die or cutting plate (11), independently of any misalignments of the axis of the drive shaft (10) relative to the axis of the die (11), thereby insuring perfect coplanarity between the same die (11) and the plane passing through the cutting edges of the blades (5).

During the cutting action, a hydrodynamic liquid film is generated between the plate (11) and the thrust bearing (6) which causes an extremely reduced shift of the blade-carrier disc (3) from the die (11), sufficient to create a separation between the cutting edges of the blades (5) and the same die (11).

The liquid film is brought about by the presence of the process liquid (e.g., water) and the revolution of the cutting device.

The distance separating the blade cutting edges and the die (11), by being of very minimum value, makes it possible to granulate any type of thermoplastic polymers, with wear of the moving parts being reduced to negligible values.

Various changes, modifications and variations may be applied to the various parts which form the cutting devices illustrated, for exemplifying purposes, in the figures of the accompanying drawings, within the scope of the present invention and without being outside its scope of protection.

What is claimed is:

1. A cutting device for high-temperature granulation of thermoplastic polymers, which comprises:
   (a) a rotor adapted to be rigidly keyed on a drive shaft;
   (b) a blade-carrier disc on which a thrust bearing is coaxially applied;
   (c) blades which are adapted to face a cutting plate and which are rigidly attached to the bladecarrier disc; and
   (d) an articulated system located between the rotor and the disc.

2. Device according to claim 1, wherein the rotor rigidly keyed on the drive shaft is a metal mass, of cylindrical shape.

3. Device according to claim 1 or 2, wherein the rotor is provided with one or more hollow spaces for housing a variable-load elastic system.

4. Device according to claim 3, wherein the elastic system comprises one or more variable-load springs.

5. Device according to claim 1 or 2, wherein the thrust bearing has different geometrical shapes, symmetrical relative to the axis of the blade-carrier disc, and is made of an antifriction material.

6. Device according to claim 1 or 2, wherein the thrust bearing has a ring-like shape.

7. Device according to claim 1 or 2, wherein the antifriction material is selected from the class consisting of graphite, polytetrafluorethylene, fiberglass-filled PTFE, and graphite impregnated with antifriction material, such as metals or synthetic resins.

8. Device according to claim 1 or 2, wherein the thrust bearing is provided with splines which assist in the formation of a supporting hydrodynamic film.

9. Device according to claim 1 or 2, wherein the thrust bearing has a contact surface such as to bring about a pressure which does not interrupt the operating liquid film, and a thickness within the range of fromn 5 to 50 mm.

10. Device according to claim 1 or 2, wherein the blades are adjusted in position and fixed on the blade-carrier disc in such a way that each blade cutting edge comes to rest against the die.

11. Device according to claim 1 or 2, wherein the articulated system comprises means for insuming the mutual coplanarity of the die and of the blade-carrier disc, apart from any misalignments of the axis of the drive shaft relative to the axis of the die.

12. Device according to claim 1 or 2, wherein the articulated system is a swinging claw coupling.

13. Device according to claim 1 or 2, wherein the articulated system is a spherical coupling.

14. Device according to claim 1 or 2, wherein the articulated system comprises two or more bars fastened, in different parts, onto the rotor keyed on the drive shaft, each having a slot through which extends a bolt screwed to the bladecarrier disc.

15. Device according to claim 14, wherein the slot has a surface area larger than the cross-sectional surface area of the bolt.

* * * * *